Figure 2:
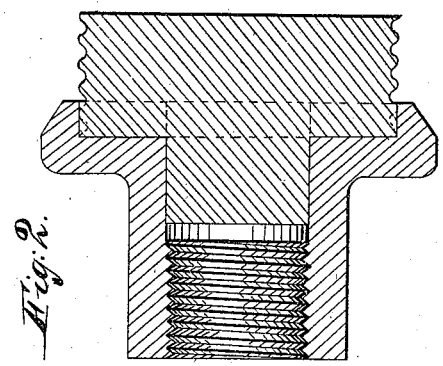
Figure 1:
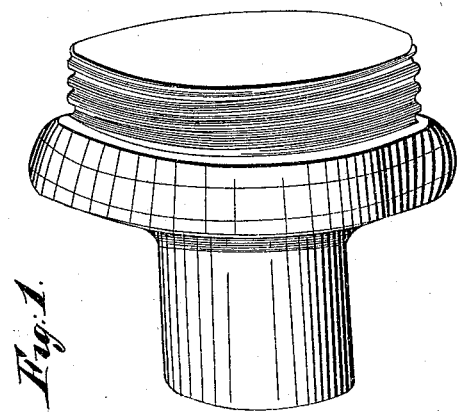

J. L. MASON.
CHUCK FOR MAKING SHEET METAL SCREWS.

No. 19,786. Patented Mar. 30, 1858.

UNITED STATES PATENT OFFICE.

JOHN L. MASON, OF NEW YORK, N. Y.

IMPROVED LATHE-CHUCK.

Specification forming part of Letters Patent No. 19,786, dated March 30, 1858.

*To all whom it may concern:*

Be it known that I, JOHN L. MASON, of the city, county, and State of New York, have invented a new and Improved Lathe-Chuck for Spinning Sheet-Metal Screw-Caps for Jars, &c., of which the following is a clear and full description, reference being had to the accompanying drawings, making a part hereof.

When I first discovered the mode of producing pressed sheet-metal screws by the process of spinning, I attempted to spin them on a chuck having the ordinary V thread. During my experiments, when temporary wooden chucks were used, I found that they might be made indifferently well on the dull threads of which the wood would admit by avoiding the pressing of the sheet metal to the bottom of the groove; but it was soon apparent that none of the ordinary forms of thread would answer the purpose when cut in perfect form in metal, as the sheet metal would be cut through at their sharp corners. I was therefore under the necessity of devising a new form for my chucks and screws. As a flange is necessary at the bottom of the screw-cap, and as cheap metal will not admit of being spun to any considerable depth, it is necessary in order to give a firm hold and an air-tight fit that the screw should extend over the whole of the convex surface and be perfect entirely down to the flange, indeed that there should be no abruptness in the termination of either the thread or the groove between the threads, as such abrupt termination would limit the tightness or extent to which the cap could be screwed down, the object being to make the cap air-tight by the perfection of its fit. To produce this screw-cap, therefore, I make my chuck or former with a screw upon its working end, the top of whose thread and the bottom of whose groove is rounded in section with a flange at the back end of the screw, and whose thread and groove are terminated only by the flange or collar. I also make the screw part of my chuck very slightly conical, so that the cap formed upon it will become slightly tighter and bind more the farther it is screwed. My chuck upon which to form the nozzles upon which the caps are to be screwed I form in the same way, with sufficient difference in the diameter to accommodate the thickness of the sheet metal.

It will be recollected that when screws are provided with a collar or flange the groove and thread terminate abruptly at the point where the side of the chaser comes against the shoulder, and as this would be wholly inadmissible in a chuck for the purposes in question, I avoid it in the following way: I make the screw part separate from the flange with a short stem at its rear. I then cut the screw on it in the most perfect manner, letting the thread and groove run entirely out at both ends. I then form the flange with stem in rear sufficient for screwing upon the mandrel of the lathe. I then bore it out for the reception of the stem on the rear of the screw. I then either screw the flange and screw together by a screw on the stem of the screw part and a corresponding screw in the flange part, or I heat the flange part and shrink the two together, the flange coming so far on that the thread and groove of the screw shall gradually terminate or vanish at the flange.

What I claim as my invention, and desire to secure by Letters Patent, is—

The chuck herein described for spinning screw-caps, &c., having a flange, a rounded thread, and a rounded groove, the groove and thread vanishing gradually at the flange, substantially as described.

JOHN L. MASON.

In presence of—
  W. P. N. FITZ GERALD,
  EDMUND M. EVANS.